United States Patent [19]

El-Gohary

[11] 4,435,764

[45] Mar. 6, 1984

[54] COMPUTER NETWORK HAVING A SINGLE ELECTRICALLY CONTINUOUS BI-DIRECTIONAL BUS

[75] Inventor: Hussein T. El-Gohary, Harvard, Mass.

[73] Assignee: Data General Corp., Westboro, Mass.

[21] Appl. No.: 290,588

[22] Filed: Aug. 6, 1981

[51] Int. Cl.³ .............................................. G06F 3/00
[52] U.S. Cl. .................................... 364/200; 323/902
[58] Field of Search ... 364/200 MS File, 900 MS File; 323/902

[56] References Cited

U.S. PATENT DOCUMENTS 4,048,672 9/1977 Seiden et al. ......................... 364/200
4,251,858 2/1981 Cambigue et al. ............... 364/200 X

OTHER PUBLICATIONS

Glaab, J., "Optical Couplers Isolate, Control and Monitor to Allow 6-KV Supply to Float," *Electronic Design* 4, Feb. 15, 1977, pp. 134-136.

*Primary Examiner*—Thomas M. Heckler
*Attorney, Agent, or Firm*—Jacob Frank; Joel Wall; Irving M. Kriegsman

[57] ABSTRACT

A computer network is disclosed in which a plurality of computer work stations are interconnected for interstation communications by a single electrically continuous bi-directional bus. Each computer work station includes a data processing device and a transceiver. The transceiver includes a receiver section for receiving signals transmitted over the bus and a transmitter section for transmitting signals onto the bus. The receiver section is coupled to the input of the data processing device by a first optical isolator and the transmitter section is coupled to the output of the data processing device by a second optical isolator. The data processing device and the first optical isolator are powered by a first power supply which is connected and grounded to the AC mains while the transceiver and second optical isolator are powered by a second power supply which is connected to the neutral conductor on the bus and is floating. The coupling and powering arrangement provides complete electrical isolation between the bus and the data processing device and noise-free transmission over the bus.

9 Claims, 1 Drawing Figure

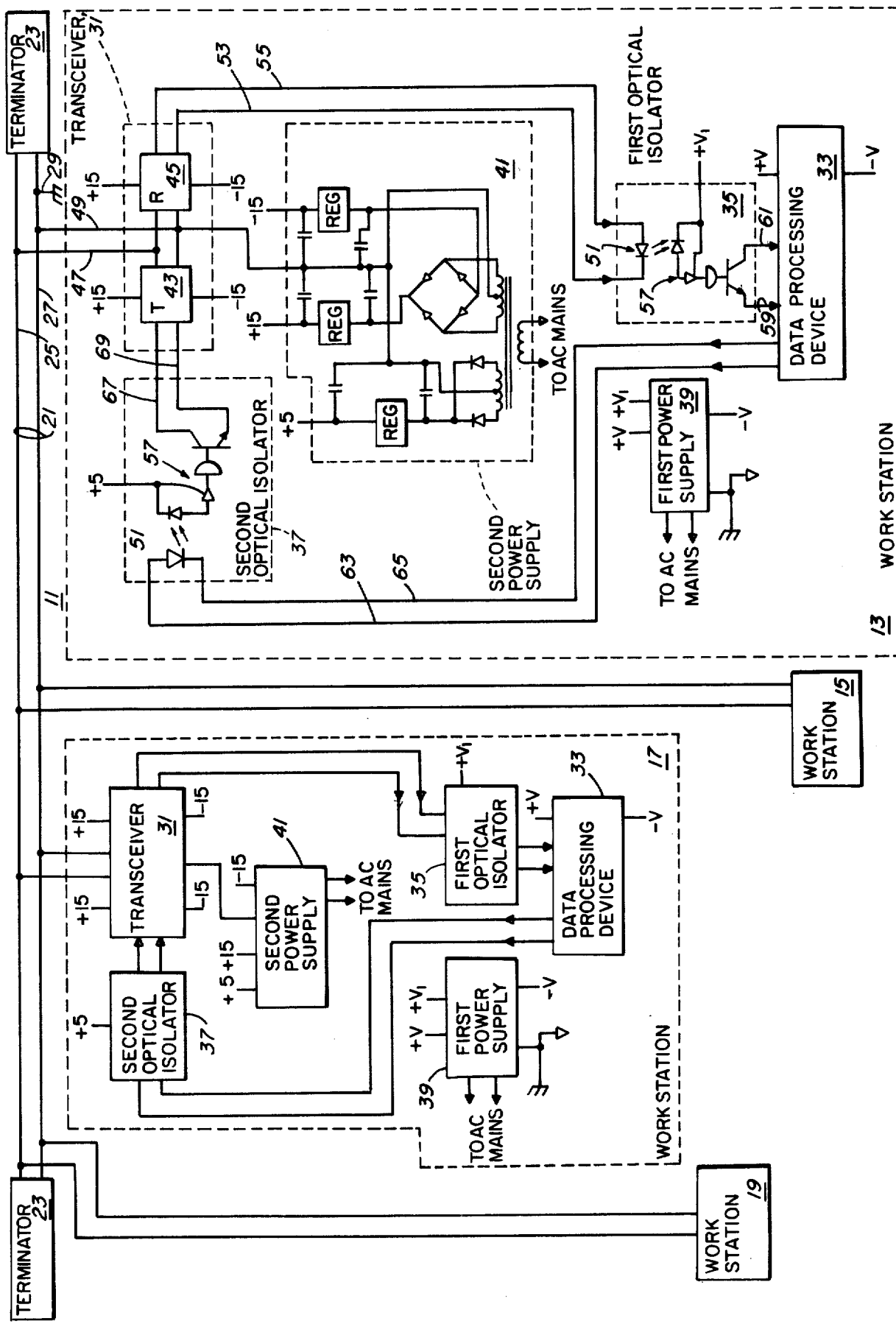

COMPUTER NETWORK HAVING A SINGLE ELECTRICALLY CONTINUOUS BI-DIRECTIONAL BUS

BACKGROUND OF THE INVENTION

The present invention relates generally to computer networks and more particularly to computer networks of the type in which a plurality of geographically dispersed computer work stations are interconnected for interstation communications by a single electrically continuous bi-directional bus.

In recent years a number of different types of computer networks have been proposed and in some cases actually implemented wherein a plurality of geographically dispersed computer work stations are interconnected by a communications channel either for communication purposes, for collectively performing system tasks from different locations or for sharing a data storage facility at one of the computer work stations.

In many of these networks, especially those in which computer work stations are relatively close, the communications channel is a single electrically continuous bi-direction bus, such as a pair of twisted wires or a coaxial cable, which is used by the stations in a message or packet switching mode. Some of the advantages of the single bus type channel are its low cost, its overall simplicity and its capability for easily adding or removing computer work stations when desired or required. In the single bus network, all station-to-station communications, including status and control signals, take place over the bus. A message can be sent by any computer station connected to the bus and can be received by every other computer work station connected to the bus. Only one message, however, can be transmitted over the bus at one time. If two or more computer stations attempt to send messages over the bus at the same time, the messages will collide and be lost. In addition, the colliding messages may create a new message which is different from all of the original messages. The new message may be received by an intended receipient of one of the original messages or even by a computer station that was not intended to be a recipient of any of the original messages. Therefore, in the operation of a single bus network it is necessary that access to the bus by the computer work stations be controlled.

A number of different techniques have been devised for controlling access to the bus in a single bi-directional electrically continuous bus network.

In one prior art technique, known as the selection technique, a computer work station may access the bus only when it has been signalled that it is its turn to do. In one class of networks using this technique, the signals placing the computer work station in control are generated by a central controller unit and then sent to the various computer work stations either by a daisy chaining arrangement, by a polling arrangement or by an arrangement known as independent requests. In another class of networks using this technique, there is no central controller unit. Instead, the control logic is distributed evenly among the computer work stations. The control signals which are generated by the computer work stations are sent from one to the other by daisy chaining, by polling or by independent requests.

In another prior art technique known as the random access technique, a computer work station desiring to access the bus does not have to wait until it is placed in control but simply monitors the bus for activity. If there is activity, the computer work station waits. If there is no activity for a predetermined time interval, the computer work station assumes the bus is clear and transmits its message.

In still another prior art technique known as the reservation technique, a computer work station desiring to transmit a message places a request to do so and then receives a future reserved time during which it may transmit its message.

In my copending patent application Ser. No. 150,713, filed on May 19, 1980 and assigned to the assignee of this patent application and which patent application is incorporated herein by reference there is described a network in which control of the bus is distributed amongst the computer work stations in a manner which is contentionless and wherein operations of the network is not dependent on the operation of any particular computer work station.

In all of the above described networks, the computer work stations each include, in addition to the particular computer device, a transceiver for transmitting data signals from the computer to the bus and receiving data signals transmitted over the bus from other computer work stations and an interface circuit for interfacing the transceiver to the computer. In addition, each computer work station also includes a power supply for supplying operating power to the transceiver and the computer device. The power supplies receive their power from AC power sources which usually originate from a common power generating station and are tied to a common ground and the bus is usually tried to the same ground as the ground for the AC power sources.

One of the problems with this arrangement is that there is the potential for ground loops (i.e. from the common ground through one computer work station to the bus and then back to the common ground through another computer work station) which can cause a degradation of data transmitted over the bus, especially during transient conditions. The noise causing the degradation of the transmitted data may be electrostatic, electromagnetic, transients in the AC power lines and it may be common mode or differential mode. For example, electrostatic noise can be produced if a computer operator picks up an electrostatic charge by walking across a rug and then discharges that charge by touching the computer chassis or a metal desk on which the computer is mounted. An electromagnetic noise, on the other hand can be produced by a nearby motor, such as for example, a passing automobile. Common mode noise can be produced by a bolt of lightning striking both wires of the power lines simultaneously or both conductors on the bus simultaneously. Differential mode noise can be produced by a transient signal appearing on either one of the wires of the power lines (i.e. a sudden surge of power). In all cases, the noise will propogate through the bus as pulses and appear at the transceivers as pulses.

It has been suggested that ground loops might be avoided by using transformers to couple the computer work stations to the bus. An example of such an arrangement may be found in U.S. Pat. No. 4,063,220. The problem with using transformers as a coupling mechanism is that although they generally eliminate DC ground loops at relatively low frequencies, they do not prevent transient signals at high frequencies, such as 100 MHZ, from passing through the system. As is known, many computer networks operate at transmission reates of around 2 megabits per second and at these rates, or higher, it is conceivable that electrostatic discharges can have very high rise times going out well beyond the 100 MHZ region. Thus, as can be appreciated, transformer coupling does not completely eliminate ground loops.

Another technique that has been proposed has involved using capacitors as the coupling mechanism rather than transformers, the size of the capacitors determining the frequencies that would be passed. Since the capacitors have to be sized to pass the data signals, that is signals, around 2 MHZ, they would also pass signals greater than 2 MHZ and thus suffer the same shortcoming as transformers.

As can be seen, in order to reliably transfer data signals from one computer work station to another over an electrically continuous bus, an arrangement must be provided for coupling the computer work stations to the bus in a manner which will not have the potential for creating ground loops.

Accordingly it is an object of this invention to provide a new and improved computer network of the type in which a plurality of computer work stations are coupled to an electrically continuous bus.

It is another object of this invention to provide an arrangement for coupling a plurality of geographically dispersed computer work stations to an electrically continuous bus which does not have the potential for creating ground loops, even at high frequencies.

It is still another object of this invention to provide a technique for coupling a plurality of computer work stations to an electrically continuous bus in a manner which avoids the potential for ground and which does not involve the inductive or capacitive couplings.

SUMMARY OF THE INVENTION

This invention is a computer network comprising an electrically continuous communications bus, a plurality of spatially separated computer work stations distributed along said bus, and each computer work station includes a transceiver connected to said bus, said transceiver including a transmitter for transmitting signal onto said bus and a receiver for receiving a signal communicated onto said bus from another station, a data processing device, a first optical isolation means for coupling said receiver to said data processing device, a second optical isolation means for coupling said transmitter to said data processing device, a first power supply for supplying operating power to said data processing device and said first optical isolation means, and a second power supply for supplying operating power to said transceiver and said second optical isolation means, said first power supply being connected and grounded to the AC mains and said second power supply means being coupled to said communications bus and being floating.

For a better understanding of the present invention, together with other aid further objects thereof, reference is made to the following description taken in conjunction with the accompanying drawings and its scope will be pointed out in the appended claims.

BRIEF DESCRIPTION OF THE DRAWINGS

In the drawings wherein like reference numerals represent like parts, the sole FIGURE is a combination block diagram and schematic diagram of an embodiment of a computer network constructed according to the teachings of the present invention.

DETAILED DESCRIPTION OF PREFERRED EMBODIMENT

Referring now to FIG. 1, there is illustrated a computer network constructed according to the teachings of the present invention and identified generally by reference numeral 11.

Computer network includes a plurality of spatially dispersed computer work stations individually labelled 13, 15, 17 and 19, the particular number of computer work stations shown being for illustrative purposes only. The computer work stations are interconnected by an electrically continous communications bus 21 which terminates at each end in a terminator labelled 23. Communications bus 21 may be in the form of a coaxial cable or a twisted pair of wires. For purposes of illustrating the invention, communications bus 21 is a conventional high frequency coaxial cable, such as a CATV cable, having a conductor 25 and a shield 27, and terminators 23 are conventional impedance matching devides, such as resistors, to limit reflections. Shield 27 may be tied to ground at a single point (only) through a lead 29.

Computer work stations 13, 15, 17 and 19 are identical in construction. For illustrative purposes, only computer work stations 13 and 17 are shown in detail, computer work station 13 being shown in somewhat more detail than computer work station 17.

As can be seen, the computer work stations each include a transceiver 31, a data processing device 33, a first optical isolator 35, a second optical isolator 37, a first power supply 39, and a second power supply 41.

Transceiver 31 includes a conventional transmitter 43 for transmitting serial data signals onto bus 21 and a conventional receiver 45 for receiving serial data signals communicated over bus 21 and is connected to bus 21 by a pair of leads 47 and 49. Data processing device 33 is any type of device capable of processing digital data such as general purpose computer, a special purpose computer, devices like input output stations or remote terminals or other peripherals and may differ in form from station to station. Each data processing device 33 includes an appropriate interface (not shown) for interfacing the data processing device 33 with transceiver 31.

Receiver 45 of transceiver 31 is coupled to data processing device 33 through first optical isolator 35 which enables signals to be transmitted from receiver 45 to data processing device 33 but, at the same time, electrically isolating receiver 45 from data processing device 33. First optical isolator 35 include includes a light emitting diode 51 which is coupled by a pair of leads 53 and 55 to the output of receiver 45 and a gate circuit 57 which is coupled to data processing device 33 through a pair of leads 59 and 61. First optical isolator 35 may comprise a Hewlett Packard IC Chip No. MCPL2602. Data processing device 33 is coupled to transmitter 43 through second optical isolator 37 which is identical in construction to first optical isolator 35 but arranged so that signals may be transmitted to transceiver 31 from data processing device 33 rather than from transceiver 31 to data processing device 33. Thus light emitting diode 51 in second optical isolator 37 is connected to data processing device 33 by a pair of leads 63 and 65 and gating circuit 57 is connected to the input of transmitter 43 by a pair of leads 67 and 69.

Data processing device 33 receives its operating power from a first power supply 39 which is connected to the AC mains. The gating circuit in first optical isolator 35 also receives its operating power from first power supply 39.

Transceiver 31 and the gating circuit 57 in second optical isolator 37 receive their operating power from a second power supply 41 which is a floating power supply. As can be seen, second power supply 41 includes a power transformer 71 having a primary winding 73 and a pair of secondary windings 75 and 77. Secondary windings 75 is connected to a rectifier circuit comprising a pair of diodes 79 and 81 which in turn is coupled to a voltage regulator 83 and a pair of filter capacitors 85 and 87. The output of voltage regulator 83 is +5 volts which is used to power gating circuit 57 in second optical isolator 37. Secondary winding 77 is coupled to a bridge rectifier circuit 89 which in turn is coupled to a pair of voltage regulators 91 and 93 and four filter capacitors 95, 97, 99, and 101 which supply output voltages of +15 volts and −15 volts. These latter two voltages are used to power transmitter 43 and receiver 45. The center tap 103 of coil 75 and the center tap 105 of coil 77 are coupled to the shield 27 on the coaxial cable 21.

As can be appreciated, by coupling the transceiver 31 to the data processing device 33 with a pair of optical isolators, by powering the optical isolator connecting the receiver 45 of transceiver 31 to data processing device 33 with power from the main power supply 39 and by powering transceiver 31 and the optical isolator connecting rransmitter 43 to data processing device 33 with a separate and floating power supply 41, transceiver 31 and bus 21 are completely electrically isolated from data processing device 33. As a result, ground loops and the potential problems of erroneous data signals associated with ground loops are completely avoided.

What is claimed is:

1. A computer network comprising:
   (a) an electrically continous communications bus,
   (b) a plurality of spatially separated computer work stations distributed along said bus, each computer work station including:
      (i) a transceiver connected to said bus, said transceiver including a transmitter for transmitting a signal onto said bus and a receiver for receiving a signal communicated onto said bus,
      (ii) a data processing device,
      (iii) first optical isolation means for coupling said receiver to said data processing device,
      (iv) second optical isolation means for coupling said transmitter to said data processing device,
      (v) a first power supply for supplying operating power to said data processing device and said first optical isolation means, and
      (vi) a second power supply for supplying operating power to said transceiver and said second optical isolation means, said second power supply means being coupled to said communications bus and being floating.

2. The computer network of claim 1 and wherein said first and second optical isolation means each comprise an optical isolator.

3. The computer network of claim 2 and wherein each one of said optical isolators comprises a light emitting diode and a light sensitive gate circuit.

4. The computer network of claim 3 and wherein said light sensitive gate circuit in said second optical isolation means has power input terminal connected to an output of said second power supply.

5. The computer network of claim 4 and wherein said light sensitive gate circuit in said first optical isolation means has a power input terminal, connected to an output of said first power supply.

6. The computer network of claim 5 and wherein said communications bus is a coaxial cable.

7. The computer network of claim 6 and wherein said second power supply comprises a transformer having primary winding means and secondary winding means, said primary winding means being coupled to an AC source and said secondary winding means having a center tap tied to said coaxial cable.

8. The computer network of claim 7 and wherein said secondary winding means comprises first and second coils, said first coil being coupled to a first circuit means for producing an output voltage for powering said second optical isolator and said second coil being coupled to a second circuit means for producing output voltages for powering said transceiver.

9. The computer network of claim 8 and wherein said bus is tied to ground at one point.

* * * * *